United States Patent [19]
Koyanagi

[11] Patent Number: 5,873,322
[45] Date of Patent: Feb. 23, 1999

[54] ENGINE START SYSTEM FOR A SMALL BOAT

[75] Inventor: Tomoyoshi Koyanagi, Iwata, Japan

[73] Assignee: Yamaha Hatsudoki Kabushiki Kaisha, Iwata, Japan

[21] Appl. No.: 733,247

[22] Filed: Oct. 18, 1996

[30] Foreign Application Priority Data

Oct. 18, 1995 [JP] Japan .................................. 7-269888

[51] Int. Cl.$^6$ .................................................. B63B 35/00
[52] U.S. Cl. ............................................ 114/270; 440/85
[58] Field of Search ............................. 114/144 R, 270; 440/84–87, 38; 180/287; 307/10.3, 10.4

[56] References Cited

U.S. PATENT DOCUMENTS 5,006,843 4/1991 Hauer ....................................... 180/287
5,229,648 7/1993 Sues et al. ............................... 180/287

FOREIGN PATENT DOCUMENTS 61-232986 10/1986 Japan .................................. 114/144 R

*Primary Examiner*—Ed L. Swinehart
*Attorney, Agent, or Firm*—Knobbe, Martens, Olson & Bear LLP

[57] ABSTRACT

A small watercraft includes a hull. A rider area that accommodates at least one rider is provided at least in part by said hull. An engine is carried by the hull and drives a propulsion unit for propelling the hull. A steering control is provided in the rider area for steering the watercraft. A control panel is also provided in the rider area. The control panel includes a plurality of push buttons. A control unit is interrelated with the push buttons and the engine so as to allow the engine to be activated when the buttons are pushed in a predetermined sequence.

9 Claims, 6 Drawing Sheets

ENGINE START SYSTEM FOR A SMALL BOAT

BACKGROUND OF THE INVENTION

The present invention relates to a small watercraft and more specifically to a start system for a small watercraft.

The popularity of small watercrafts of the personal type has increased dramatically in recent years. Unfortunately, this increase in popularity has also brought about an increase in personal watercraft theft.

In order to protect against personal watercraft theft, personal watercrafts of the past have included a number of anti-theft devices. One of these devices is a lanyard switch that also functions as an emergency shut-off device. The lanyard switch includes a stop switch that protrudes from a handlebar assembly and a claw-shaped lanyard lock plate that engages the stop switch for allowing an ignition system of an engine to operate. The lock plate includes a cord and wrist strap for attaching the lock plate to an operator's wrist so that if the operator falls off of the watercraft during operation, the lock plate will disengage the stop switch so as to kill the engine. The lanyard switch provides some anti-theft protection because the lock plate is required to engage the stop switch in order to start and operate the engine. The problem with using a lanyard switch as the only means of anti-theft protection is that other plates and mechanisms can be substituted for the lock plate that also allow the engine to start and operate. As a result, the lanyard switch alone does not provide significant anti-theft protection.

Another device in personal watercrafts of the past that provides anti-theft protection is an anti-theft ignition key. This key allows the starting motor, which starts the engine, to be activated by a start switch located on the handlebar assembly of the watercraft. The key helps to protect against theft because without it, the watercraft engine is virtually impossible to start.

One drawback of this anti-theft ignition key is that the watercraft is effectively inoperable if the operator loses or forgets the key. Another drawback of this key is that it can be a nuisance to carry around in between watercraft uses because the operator is typically wearing a bathing suit that does not include a convenient means for carrying the key.

It is therefore a primary object of the present invention to provide significant anti-theft protection in the start system of a small watercraft that does not require a key.

SUMMARY OF THE INVENTION

A small watercraft includes a hull. A rider area that accommodates at least one rider is provided at least in part by the hull. An engine is carried by the hull and drives a propulsion unit for propelling the hull. A steering control is provided in the rider area for steering the watercraft. A control panel is also provided in the rider area. The control panel includes a plurality of push buttons. A control unit is interrelated with the push buttons and the engine so as to allow the engine to be activated when the buttons are pushed in a predetermined sequence.

DETAILED DESCRIPTION OF THE PREFERRED EMBODIMENT

Figure 1:
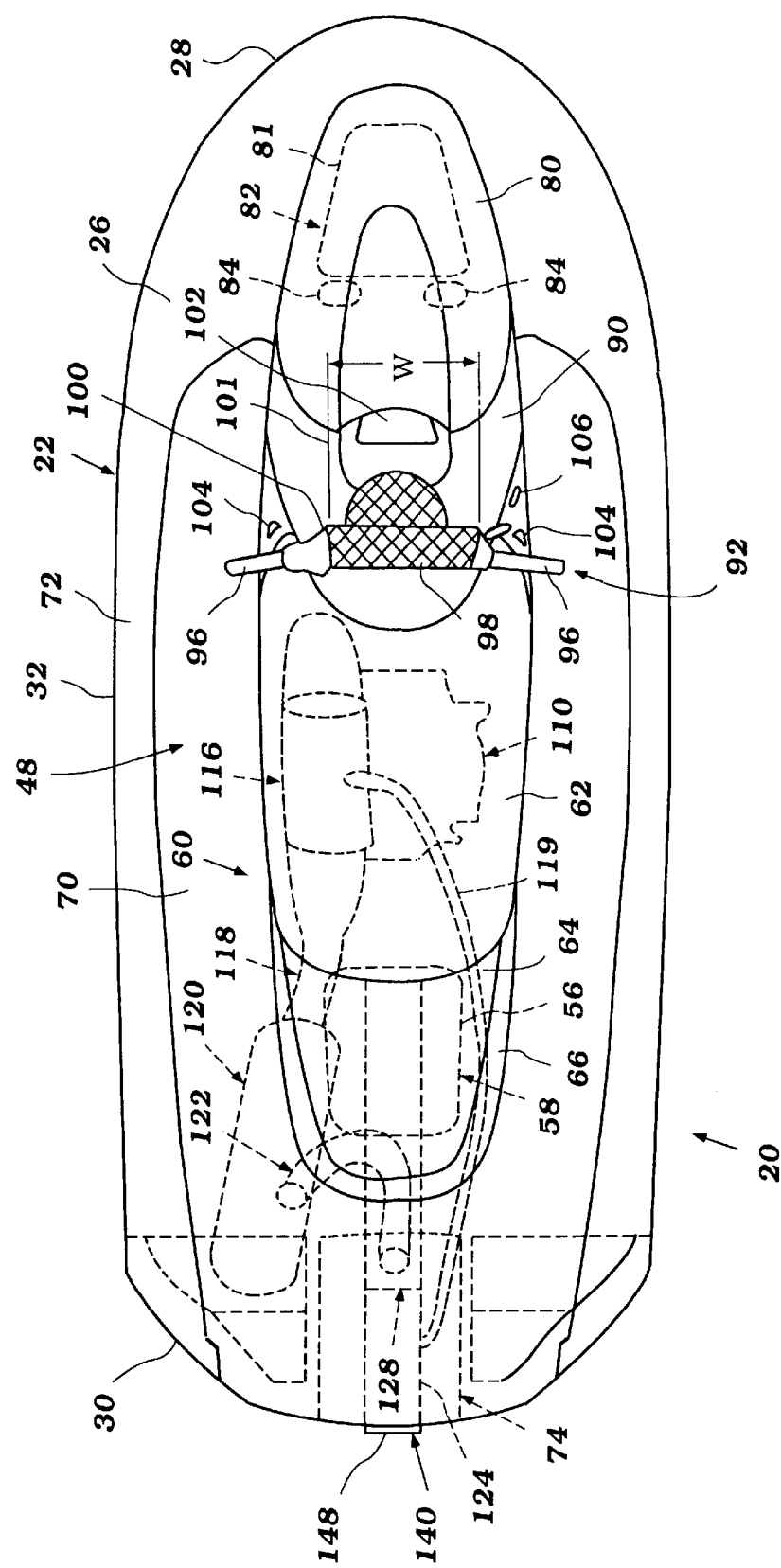
FIG. 1 is a top plan view of a personal watercraft and shows a portion of the watercraft in phantom.
Figure 2:
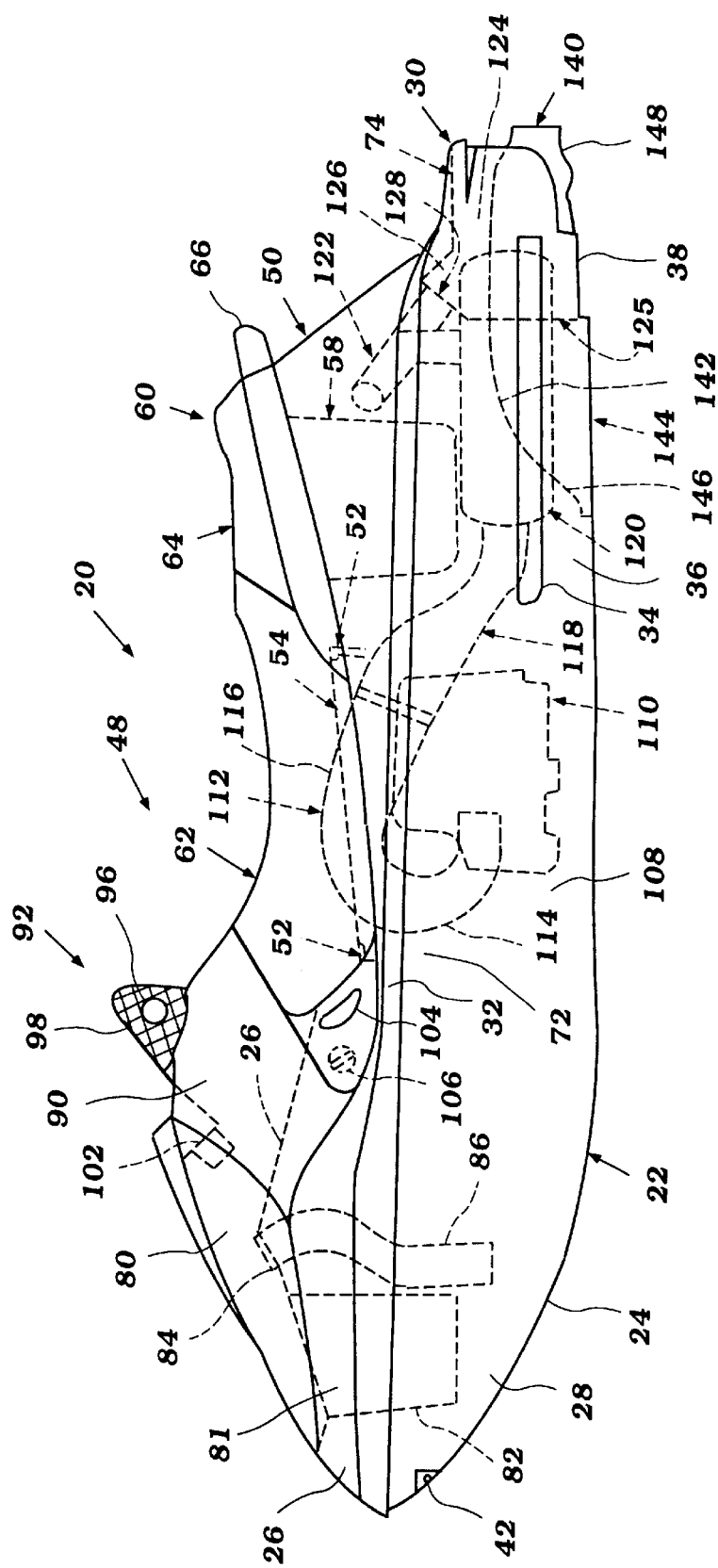
FIG. 2 is a side elevational view of the personal watercraft of FIG. 1 and shows a portion of the watercraft in phantom.

With reference to the drawings, and initially to FIGS. 1 and 2, a small watercraft constructed in accordance with an embodiment of the invention is identified generally by the reference numeral 20. The watercraft 20 is depicted as being of the type known as a personal watercraft. Although the invention is described in conjunction with this type of watercraft, it will be readily apparent to those skilled in the art that certain facets of the invention may be employed with other types of watercrafts or other types of vehicles.

The watercraft 20 comprises a hull assembly, indicated generally by the reference numeral 22. The hull assembly includes a lower hull portion 24 and an upper deck portion 26. The hull 22 also includes a bow portion 28 and a stem portion 30. The portions 24, 26 are formed from a suitable material such as molded fiberglass-reinforced resin, or the like, and are connected to each other in any known manner in the art. Normally, the connection is provided at an outstanding flange or gunnel 32.

The lower hull portion 24 includes a pair of sponsons 34 located on opposite sides 36 of the lower hull 24 in the stem portion 30 of the watercraft 20. The sponsons 34 improve the turning performance of the watercraft 20. The undersurface of the stem portion 30 of the lower hull 24 has a step-shaped construction 38. The step-shaped construction of the undersurface reduces the drag on the watercraft 20 during operation because less of the hull undersurface contacts the water.

Figure 3:
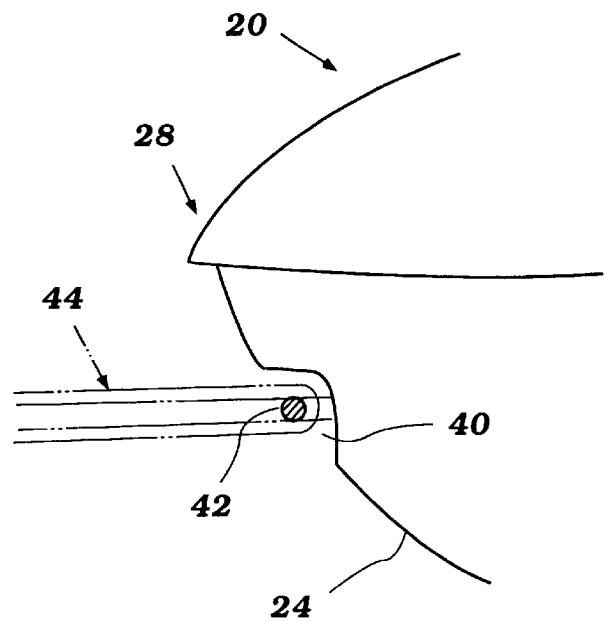
FIG. 3 is a partial side view of the bow portion of a personal watercraft and shows a tow rope connected to a tow bar of the watercraft.
Figure 4:
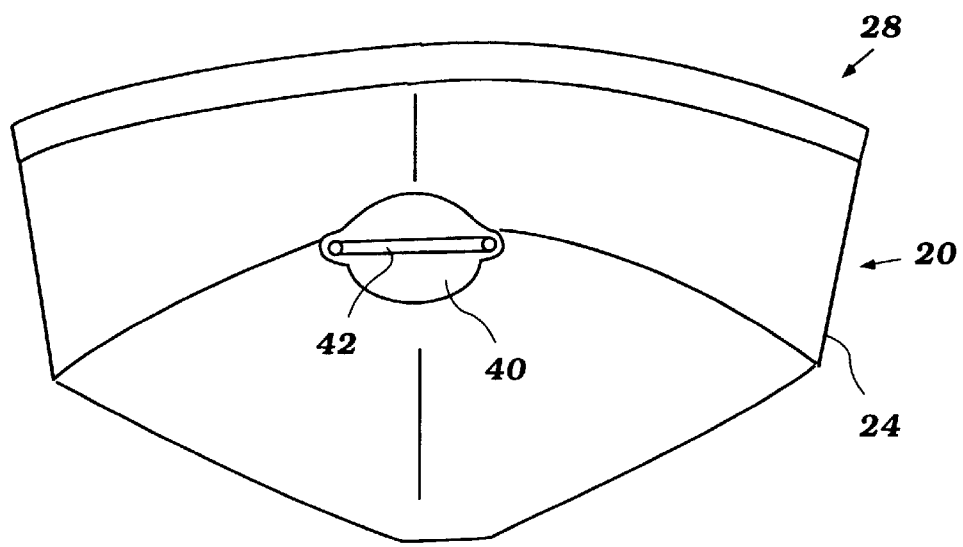
FIG. 4 is a front view of the bow portion of the personal watercraft of FIG. 3.

As illustrated in FIGS. 3 and 4, the bow portion 20 of the lower hull 24 includes a recessed area 40. The recessed area 40 accommodates a horizontally-extending tow bar 42. The tow bar 42 is provided along the centerline of the hull and is designed for towing the watercraft with a rope 44.

Figure 5:
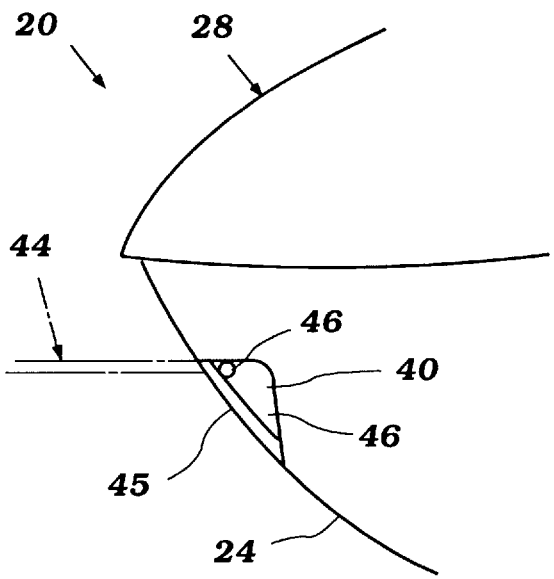
FIG. 5 is a partial side view of the bow portion of a personal watercraft of the prior art and shows a tow rope connected to a tow bar of the watercraft.
Figure 6:
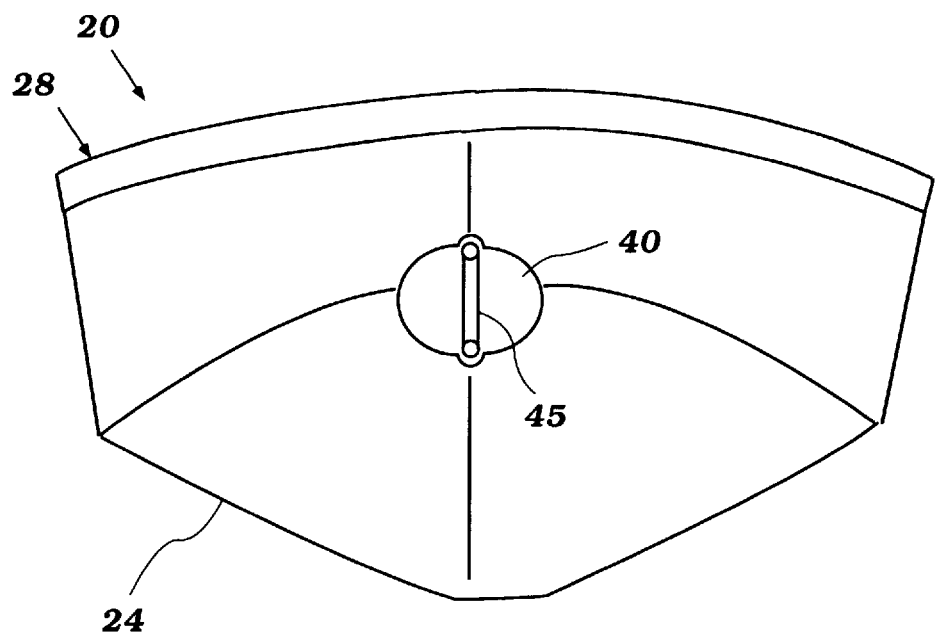
FIG. 6 is a front view of the bow portion of the personal watercraft of FIG. 5.

With reference to FIGS. 5 and 6, personal watercrafts of the prior art have included a vertically-extending tow bar 45 at this same hull location. The vertically-extending tow bar 45 and recessed area 40 form a pair of opposite wedge-shaped apertures 46. When the watercraft 20 is towed, the tow rope 44 has a tendency to slide towards an upper end of the tow bar 45 and become wedged within the upper wedge-shaped aperture 46. Consequently, it is difficult to remove the tow rope 44 once towing is completed.

The horizontal nature of the horizontally-extending tow bar 42 helps to prevent the tow rope 44 from sliding towards one end of the tow bar 42 and becoming wedged between the tow bar 42 and the lower hull 24.

With reference back to FIGS. 1 and 2, the majority of the upper deck 26 forms a rider's area 48. A longitudinally-elongated raised pedestal 50 extends from the upper deck 26 in this area 48. A generally rectangular flange 52 extends from a front portion of an upper surface of the raised pedestal 50 and defines the periphery of a corresponding generally rectangular access opening 54. The access opening 54 provides access to an engine compartment to be described.

A second generally rectangular flange (not shown) extends from a rear portion of the upper surface of the raised pedestal 50 and defines the periphery of a corresponding second generally rectangular opening 56. A storage container 58 for storing various items rests within the opening 56.

A seating assembly 60 is supported by the upper surface of the raised pedestal 50. The seating assembly 60 is designed to seat one or more riders in a straddle-type fashion. The seating assembly 60 includes a removable front seat 62 that allows access to an engine compartment and a removable rear seat 64 that allows access to the storage container 50. Each of the seats 62, 64 are detachably secured to the upper surface of the raised pedestal 50 by a guiding and latching assembly (not shown).

An insert piece 66 is provided near the peripheral edge of the rear portion of the upper surface of the raised pedestal 50. The insert piece 66 is partially interposed between a rear portion of the seating assembly 60 and the rear portion of the upper surface of the raised pedestal 50. The insert piece 66 includes a grip (not shown) for assisting the riders in boarding the watercraft 20 from the rear and a venting mechanism (not shown) for drawing air from the engine compartment.

As illustrated in FIG. 1, a pair of foot areas 70 are provided on opposite sides of the pedestal 50 between the pedestal 50 and the gunnels 32. Riders may place their feet on the foot areas 70 when straddling the seating assembly 60. The outer portions of the foot areas 70 are bounded by raised gunnels 72. The raised gunnels 72 provide protection for the sides of the riders. A rear part of each of the foot areas 70 opens into a boarding platform 74 that is used by the riders, preferably in conduction with the aforementioned grip, to assist them in boarding the watercraft 20 from the rear.

The bow portion 28 of the upper deck 26 includes a hatch cover 80 hingeably connected to the upper deck 26. A container opening 81 is provided in the upper deck 26 for accomodating a front storage container 82 located beneath the hatch cover 80.

A pair of atmospheric air inlets 84 are provided in the upper deck 26 behind the container opening 81. The air inlets 84 communicate with a ventilating duct 86 for supplying air to the engine compartment.

A raised control area 90 extends vertically from the upper deck 26, rearward of the hatch cover 80 and forward of the seating assembly 60. The control area 90 includes a handlebar assembly 92 with opposing handlebars 96 for steering the watercraft in a manner that will be described. The handlebar assembly 92 carries a variety of controls such as a throttle control (not shown), start switch 97 (FIG. 7) and lanyard switch (not shown) adjacent to the handlebars 96. The lanyard switch includes a stop switch that protrudes from the handlebar assembly 92 and a claw-shaped lanyard lock plate that engages the stop switch for allowing an ignition system of an engine to be described to operate.

The handlebar assembly also includes a cushion pad 98 preferably made of rubber that is located between the opposing handlebars 96. The pad 98 may be constructed of other materials such as plastic or the like. The pad 98 includes opposite lateral ends 100 that form imaginary longitudinally-extending boundary lines 101 that define a lateral width W. A control panel 102, which will be described in more detail below, is provided in front of the cushion pad 98 and within the width W of the longitudinally-extending boundary lines.

A second pair of air inlets 104 are provided along opposite sides of the raised control area 90 for supplying air to the engine compartment. Adjacent to one of the air inlets 104, a fuel cock 106 is provided for controlling the supply of fuel to an engine to be described.

The lower hull portion 24 and upper deck portion 26 form an engine compartment 108 located at least in part below the raised pedestal 50. The engine compartment 108 terminates at its rear end in a bulkhead (not shown). Mounted within the engine compartment, forwardly of the bulkhead and primarily beneath a front part of the seating assembly 60, is an internal combustion engine, indicated generally by the reference numeral 110. The engine 110 is preferably a two-cylinder engine or three-cylinder engine that operates on a two-stroke, crankcase compression principle. Those skilled in the art will readily appreciate that the invention can be employed with engines having a wide variety of engine designs. For example, the invention can be employed with other types of engines, engines that run on other combustion principles or engines that have various cylinder numbers and orientations.

Since the invention deals primarily with an engine start system, many of the details of the engine 110 and related systems are not necessary to understand the construction and operation of the invention. Therefore, if any detail of the engine 110 or engine-related systems is not described, it may be considered to be conventional.

Figure 7:
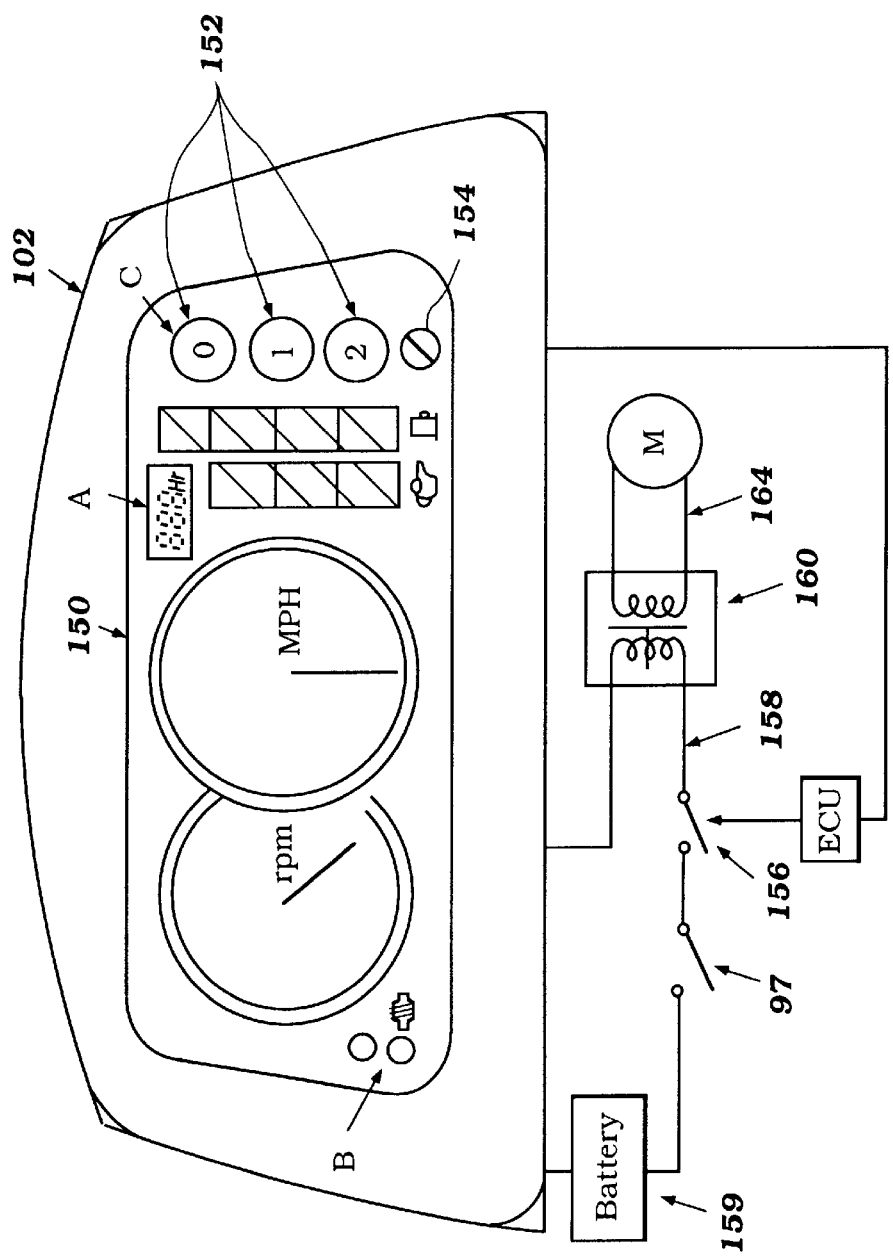
FIG. 7 is a partially schematic enlarged front view of a control panel and start system constructed in accordance with an embodiment of the invention.

The engine 110 is provided with a starter motor, indicated schematically in FIG. 7 as M, which is preferably mounted to the side of the engine 110 and has a pinion (not shown) with teeth that become enmeshed with the teeth of a corresponding ring gear (not shown) formed on a flywheel of the engine 110 for starting the engine 110 in a known manner. The starter motor 111 is activated in a manner that will be described in more detail below.

The engine 110 includes a plurality of combustion chambers (not shown) that receive an air and fuel charge from an induction system and a plurality of charge formers in well known manner. A fuel tank (not shown), which is preferably positioned in front of the engine 110, supplies fuel to the charge formers. The fuel and air charge is ignited by means of spark plugs, one of which is indicated as reference numeral 111 in FIG. 8. The manner in which the spark plugs 111 are ignited will be described in more detail below.

As illustrated in FIGS. 1 and 2, an exhaust system, indicated generally by the reference numeral 112, communicates with the engine 110 for removing exhaust gases from the watercraft. The exhaust system 112 includes an exhaust manifold (not shown) that receives the exhaust gases from the engine 10 in a well-known manner and transfers them through a C-shaped pipe section 114 to an expansion chamber device 116. The expansion chamber device 116 is disposed to one side of the engine 110 and extends at least partially through the access opening 54 of the raised pedestal 50.

The expansion chamber 116 includes a water-cooling jacket (not shown) for maintaining this part of the exhaust system 112 at a desired temperature. Cooling water is delivered to the cooling jacket and is discharged downstream into an exhaust conduit pipe 118, which communicates with the expansion chamber 116, to be mixed with the exhaust gases. Discharging cooling water into the exhaust pipe 118 can cause an increase in exhaust back pressure. In order to reduce exhaust gas back pressure caused by discharging cooling water in the exhaust system 112, a conduit 119 is provided between the expansion chamber 116 and a tunnel on the undersurface of the lower hull 24 for removing some of the cooling water from the expansion chamber cooling jacket The exhaust pipe 118 delivers exhaust gases to a water trap device 120. The water trap device 120, as is well known in the marine art, is designed so as to permit the exhaust gases and cooling water to exit the watercraft while inhibiting the back flow of water to the engine 110 through the exhaust system 112.

An exhaust pipe 122 discharges exhaust gases at a downward angle into a rear tunnel 124 of the aforementioned tunnel. The rear tunnel 124 is defined by a rear tunnel wall 125 formed by the underside of the lower hull portion 24. The exhaust pipe 122 is connected to the rear tunnel wall 125 at a protruding portion 126 that extends from the rear tunnel wall 125. The protruding portion 126 includes an angled face 128 where the exhaust pipe 122 and protruding portion 126 are joined. The exhaust pipe 122 discharges exhaust gases at a downward angle towards the water in the rear tunnel 124. By discharging the exhuast gases in this manner, water is inhibited from entering the exhaust system 112 and assists in the silencing of the exhaust gases.

The engine 110 drives a rotating output shaft (not shown), such as a crankshaft, that extends rearwardly from the engine 110. A coupling interconnects the engine output shaft with an impeller shaft (not shown). The impeller shaft extends within a jet propulsion unit 140.

The jet propulsion unit 140 is housed within the aforementioned tunnel formed on the underside of the lower hull portion 24. The jet propulsion unit 140 includes an outer housing assembly that has a water inlet duct-forming portion 142 that terminates in a downwardly-facing water inlet opening 144. Water is supplied to the opening 144 in a manner that will be described. The housing includes a forwardly extending tubular portion (not shown) through which the aforementioned impeller shaft passes.

An impeller (not shown), affixed for rotation with the impeller shaft, draws water through the inlet opening 144 and through an inlet channel 146. The water is discharged through straightening vanes and a discharge nozzle portion (not shown). The water then passes through a steering nozzle 148. The steering nozzle 148 is supported for steering movement about a vertically-extending steering axis (not shown) and is coupled to the handlebar assembly 92 for steering of the watercraft in a well-known manner.

With reference to FIG. 7, an engine start system constructed in accordance with an embodiment of the invention will now be described. The aforementioned control panel 102 includes a multi-function display 150 with a variety of gauges. One of these gauges is a hour meter/stop watch gauge A. The hour meter/stop watch gauge A includes an hour meter mode that indicates the amount of time the engine has been operating and a stop watch mode that serves as a stop watch. The hour meter/stop watch gauge A can include a variety of other modes. A mode changing switch B is provided in the lower left corner of the display 150. The mode changing switch B is used to change the mode of the hour meter/stop watch gauge A. On the right-hand side of the display 150, a plurality of push buttons 152 are provided. When the engine 110 is operating, a top push button C of the push buttons 152 functions as a start, stop and reset button for the stop watch mode of the hour meter/stop watch gauge A. For example, when the button C is pressed once, the stop watch starts. When the button C is pressed again, the stop watch stops. Finally, when the button C is pressed a third time, the stop watch resets. Each of the push buttons 152 is marked with a corresponding number. An indicator 154 is provided below the push buttons 152 for indicating whether the start system is enabled for starting the engine 110.

As illustrated in FIG. 1, the push buttons 152 of the control panel 102 are located within the width W of the longitudinally extending imaginary boundary lines 101. This location makes the push buttons 152 easy to access. The cushion pad 98 of the handlebar assembly 92 provides comfortable support for the operator to rest his or her elbows on while accessing the push buttons 152.

With reference back to FIG. 7, the push buttons 152 are interrelated with an ECU for controlling the closing of a switch 156 of a starting circuit 158. The starting circuit 158 also includes a battery 159, the aforementioned starting switch 97 and a relay 160. When the engine 110 is off and the push buttons 152 are pressed in a predetermined sequence, the ECU causes the switch 156 to close. When the push buttons 152 are not pressed in the proper predetermined sequence, the ECU is designed to have no effect on the switch 156. Also, the ECU is designed to have no effect on the switch 156 if the engine 110 is operating and the push buttons 152 are manipulated, even if the push buttons 152 are manipulated in the predetermined sequence. The ECU is designed to have no effect on the switch 156 if the engine 110 is operating and the push buttons 152 are manipulated because when the engine 110 is operating, the push buttons 152 are designed control things other than the switch 156, such as the starting, stopping and resetting of the aforementioned stop watch of the hour meter/stop watch gauge A.

If an operator wishes to start the engine 110 of the watercraft in order to use the watercraft, the operator first inputs the push buttons 152 in the predetermined sequence so as to close the switch 156 of the starting circuit 158. Then, the operator manipulates the starting switch 97 on the handlebar assembly 92. The closing of this switch 97 causes the starting circuit 158 to energize a winding of the relay 160. This causes a contact of the relay 160 to close a second starting circuit that includes the aforementioned starting motor M. The closing of the second starting circuit 164 activates the starting motor M so as to start the engine 110 in a well known manner.

When the engine 110 is stopped through a stop switch or lanyard switch, the switch 156 of the starting circuit 158 preferably automatically opens. The start system can be designed so that when the engine 110 is stopped, the push buttons 152 must be manually manipulated in the aforementioned predetermined sequence, or in a different predetermined sequence, to open the switch 156. In this case, when the engine 110 is stopped through a stop switch or lanyard switch, the switch 156 remains closed until a predetermined sequence is manually inputted. Either way, the switch 156 is opened and remains open until the push buttons 152 are manipulated in the predetermined sequence mentioned above that allows the starting of the engine 110. Thus, the engine 110 is prevented from being 110 started without inputting the predetermined sequence first.

Figure 8:
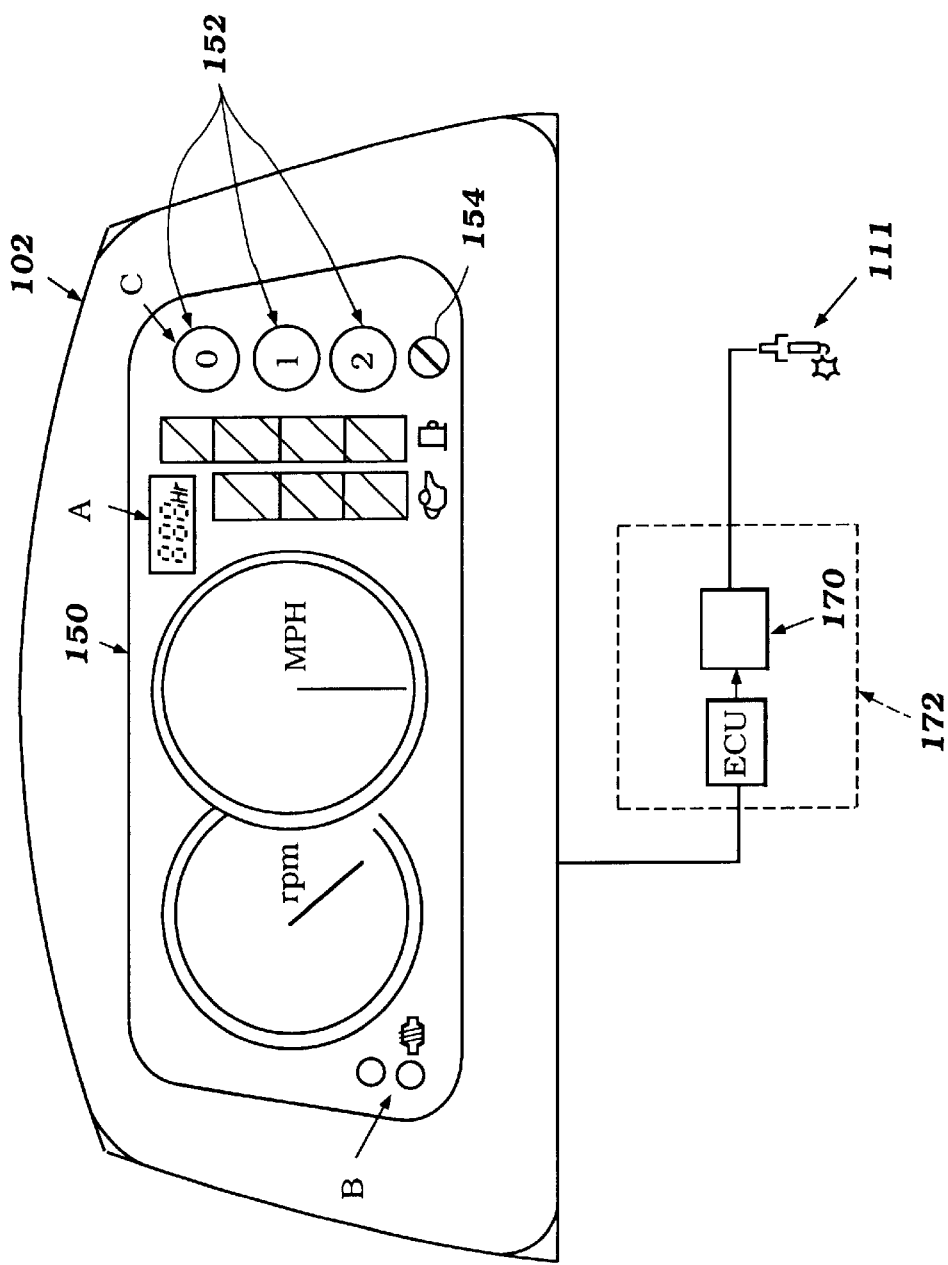
FIG. 8 is a partially schematic enlarged front view of a control panel and start system constructed in accordance with a second embodiment of the invention.

With reference to FIG. 8, an engine start system constructed in accordance with a second embodiment of the invention will now be described. The starting of the engine 110 can also be controlled by controlling the ignition system since the spark plugs 111 must fire for the engine 110 to turn over. In this embodiment of the invention, the push buttons 152 are interrelated with an ECU for controlling the operation of an ignition unit 170 which causes the aforementioned spark plugs 111 to fire. The ignition unit 170 is of the capacitor discharge type that preferably includes a magneto generator having a charging coil which is in circuit with the spark plugs 111 for firing the spark plugs 111. The ignition unit 170 and ECU, along with a variety of other electrical components, are contained within a sealed electrical box 172 that protects the electrical components from damage by water.

When the push buttons 152 are manipulated in a predetermined sequence, the ECU allows the firing of the spark plugs 111 by die ignition unit 170 so that the engine 110 can be started. When the engine is stopped through a stop switch or lanyard switch, the ignition unit 170 is preferably automatically disenabled. The start system can be designed so that when the engine 110 is stopped, the push buttons 152 must be manipulated in the aforementioned predetermined sequence, or a different predetermined sequence, to disenable the ignition unit. In this case, when the engine is stopped through a stop switch or lanyard switch, the ignition unit remains enabled until a predetermined sequence is inputted. Either way, the ignition unit 170 is disenabled and remains disenabled until the push buttons 152 are inputted in the aforementioned predetermined sequence to allow the engine 110 to be started. Thus, the engine 110 is prevented from starting until the predetermined sequence is first inputted.

Allowing the starting of the engine 110 through the manipulation of a plurality of buttons helps to prevent watercraft theft without the need for an ignition key. Keyless anti-theft protection prevents the problems associated with keys such as losing or forgetting the key. Furthermore, keyless anti-theft protection eliminates the inconvenience of having to carry an ignition key around between watercraft uses. Carrying around a key is a particular nuisance for small watercraft users because they are typically limited to wearing a bathing suit that does not include a convenient means for carrying a key.

Compared to personal watercrafts that only include a lanyard switch for preventing watercraft theft, the start system of the present invention provides significant additional anti-theft protection because substituting a plate or other mechanism for the lanyard lock plate in the small watercraft of the present invention will not necessarily allow the engine of the watercraft to start.

It should be readily apparent from the foregoing description of the preferred embodiment of the invention how the start system of the present invention provides significant protection against watercraft theft and eliminates the problems of an ignition key. Of course, the foregoing description is that of a preferred embodiment of the invention, and various changes and modifications may be made without departing from the spirit and scope of the invention, as defined by the appended claims.

What is claimed is:

1. A small watercraft comprising a hull, a rider area that accommodates at least one rider provided at least in part by said hull, an engine carried by said hull, said engine driving a propulsion unit for propelling said hull, a steering control provided in the rider area for steering of the watercraft, a control panel provided in the rider area, the control panel including a plurality of push buttons, a control unit interrelated with said push buttons and said engine for enabling the operation of said engine only when said buttons are operated in a predetermined sequence, at least one of said buttons being associated with another watercraft control for operation of said other control in addition to permitting enablement of the operation of said engine.

2. The small watercraft of claim 1, further including a circuit having a starter motor that is operatively associated with the engine for starting said engine, a second circuit including a switch and a relay, the control unit being interrelated with said switch so as to close said switch when said buttons are operated in the predetermined sequence for allowing said relay to be energized and activating said starter motor.

3. The small watercraft of claim 2, wherein said switch is automatically opened when said engine is stopped.

4. The small watercraft of claim 2, wherein said switch remains closed when said engine is stopped.

5. The small watercraft of claim 4, wherein said control unit is interrelated with said switch so as to open said switch when said buttons are pushed in a predetermined sequence for preventing the relay to be energized and activating said starter motor.

6. The small watercraft of claim 5, wherein the predetermined sequence to close the switch and the predetermined sequence to open the switch are different.

7. The small watercraft of claim 1, further including an ignition unit, a spark plug interrelated with said ignition unit which fires a spark for activating said engine, said control unit interrelated with said ignition unit for allowing the firing of said spark plug when said buttons are pushed in said predetermined sequence.

8. The small watercraft of claim 1, wherein said steering control includes a handlebar assembly having a pair of handlebars, a pad provided on said handlebar assembly between said handlebars.

9. The small watercraft of claim 8, wherein said pad includes opposite lateral ends, said opposite lateral ends form corresponding imaginary longitudinally extending boundary lines, said control panel is provided in front of said pad and between said imaginary longitudinally-extending boundary lines.

* * * * *